(12) United States Patent
Quesada Saborio (10) Patent No.: US 9,733,024 B2
(45) Date of Patent: Aug. 15, 2017

(54) TUBING ELEMENT WITH FINS FOR A HEAT EXCHANGER (71) Applicant: Carlos Quesada Saborio, San José (CR)

(72) Inventor: Carlos Quesada Saborio, San José (CR)

( * ) Notice: Subject to any disclaimer, the term of this patent is extended or adjusted under 35 U.S.C. 154(b) by 178 days.

(21) Appl. No.: 14/094,230

(22) Filed: Dec. 2, 2013

(65) Prior Publication Data
US 2014/0151007 A1 Jun. 5, 2014

Related U.S. Application Data (60) Provisional application No. 61/731,726, filed on Nov. 30, 2012, provisional application No. 61/731,715, (Continued)

(51) Int. Cl.
| | |
|---|---|
| *F28F 13/12* | (2006.01) |
| *F28F 1/26* | (2006.01) |
| *F28D 1/047* | (2006.01) |
| *F28F 1/00* | (2006.01) |
| *F28F 1/12* | (2006.01) |
| *B23P 15/26* | (2006.01) |

(Continued)

(52) U.S. Cl.
CPC ............. *F28F 1/006* (2013.01); *B23P 15/26* (2013.01); *F28D 1/0473* (2013.01); *F28F 1/022* (2013.01); *F28F 1/025* (2013.01); *F28F 1/12* (2013.01); *F28F 1/34* (2013.01); *F28F 17/005* (2013.01); *F28F 1/26* (2013.01); *F28F 2260/02* (2013.01); *Y10T 29/4935* (2015.01); *Y10T 29/49391* (2015.01)

(58) Field of Classification Search
CPC ........... F28D 2001/0273; F28D 1/0473; F28D 1/022; F28D 1/12; F28D 1/26
USPC ....................... 165/125, 177, 183, 109.1, 181
See application file for complete search history.

(56) References Cited

U.S. PATENT DOCUMENTS

| 384,202 A | 6/1888 | Grove |
| 1,403,319 A * | 1/1922 | Harter ...................... F28D 7/08 |
| | | 165/125 |

(Continued)

FOREIGN PATENT DOCUMENTS

| DE | 2209329 | 9/1972 |
| DE | 2209325 | 9/1973 |

(Continued)

*Primary Examiner* — Leonard R Leo
(74) *Attorney, Agent, or Firm* — James Creighton Wray; Meera P. Narasimhan (57) ABSTRACT A tubing element for a heat exchanger is at least partially a rigid elongated tubing having a first end, a second end, a first side wall and a second side wall. First and second side walls are substantially parallel to each other. The distance between first side wall and second side wall is considerably smaller than the width of first side wall and second side wall, resulting in a substantially overall flat tubing structure with connection walls on both sides. The tubing element has a plurality of fins on at least one of the outer surfaces of the first side wall and/or of the second side wall. Fins define an angle enclosed by the fins and a connection wall. A heat exchanger, use of a tubing element, use of a heat exchanger and method of manufacturing of a tubing element to manufacture at least partially a heat exchanger are included.

20 Claims, 12 Drawing Sheets

Related U.S. Application Data filed on Nov. 30, 2012, provisional application No. 61/731,738, filed on Nov. 30, 2012.

(51) Int. Cl.
*F28F 17/00* (2006.01)
*F28F 1/02* (2006.01)
*F28F 1/34* (2006.01)

(56) References Cited

U.S. PATENT DOCUMENTS

| | | | |
|---|---|---|---|
| 1,458,128 A * | 6/1923 | Curran | F28F 1/128 165/153 |
| 1,721,284 A * | 7/1929 | Spery | F28F 1/12 165/153 |
| 1,791,528 A * | 2/1931 | Hull | F25B 39/04 165/132 |
| 1,988,224 A * | 1/1935 | Wendel | F28F 1/26 165/181 |
| 1,992,561 A * | 2/1935 | Wendel | F28F 1/26 165/181 |
| 2,834,582 A * | 5/1958 | Kablitz | F28F 3/04 165/166 |
| 3,662,582 A | 5/1972 | French | |
| 3,692,100 A | 9/1972 | Gallagher, Jr. | |
| 3,727,682 A * | 4/1973 | Pasternak | F28F 1/12 165/183 |
| 4,144,933 A * | 3/1979 | Asselman | F28B 1/06 165/153 |
| 4,171,015 A * | 10/1979 | Bucey | F28F 1/26 165/181 |
| 4,341,088 A | 7/1982 | Mei et al. | |
| 4,349,489 A | 9/1982 | Gaget | |
| 4,397,331 A | 8/1983 | Medlar | |
| 4,860,993 A | 8/1989 | Goode | |
| 5,076,354 A * | 12/1991 | Nishishita | F28D 1/05391 165/153 |
| 5,490,559 A * | 2/1996 | Dinulescu | F28B 1/06 165/183 |
| 5,505,257 A * | 4/1996 | Goetz, Jr. | F28F 1/126 165/183 |
| 5,765,630 A * | 6/1998 | Bloomer | F28D 1/024 165/121 |
| 5,775,187 A * | 7/1998 | Nikolai | F28F 1/26 407/113 |
| 6,250,602 B1 | 6/2001 | Jansen | |
| 6,272,867 B1 | 8/2001 | Barrash et al. | |
| 6,279,333 B1 | 8/2001 | Cilli et al. | |
| 6,332,327 B1 | 12/2001 | Street et al. | |
| 6,481,216 B2 | 11/2002 | Simmons et al. | |
| 6,564,563 B2 | 5/2003 | Goth et al. | |
| 6,637,452 B1 | 10/2003 | Alman | |
| 6,644,056 B2 | 11/2003 | Goth et al. | |
| 6,647,735 B2 | 11/2003 | Street et al. | |
| 6,662,588 B2 | 12/2003 | Houk et al. | |
| 6,688,125 B2 | 2/2004 | Okamoto et al. | |
| 6,698,218 B2 | 3/2004 | Goth et al. | |
| 6,742,343 B2 | 6/2004 | Matanog et al. | |
| 6,848,670 B2 | 2/2005 | Haunhorst | |
| 6,973,794 B2 | 12/2005 | Street et al. | |
| 7,000,422 B2 | 2/2006 | Street et al. | |
| 7,013,655 B2 | 3/2006 | Des Champs | |
| 7,047,753 B2 | 5/2006 | Street et al. | |
| 7,080,521 B2 | 7/2006 | Ludwig et al. | |
| 7,142,424 B2 * | 11/2006 | Malone | F28F 1/24 165/104.33 |
| 7,228,691 B2 | 6/2007 | Street et al. | |
| 7,254,956 B2 | 8/2007 | Matanog et al. | |
| 7,260,946 B2 | 8/2007 | Ludwig et al. | |
| 7,266,961 B2 | 9/2007 | Ludwig et al. | |
| 7,270,278 B2 | 9/2007 | Street et al. | |
| 7,320,225 B2 | 1/2008 | Street et al. | |
| 7,406,834 B2 | 8/2008 | Williams | |
| 7,448,409 B2 | 11/2008 | Micheel | |
| 7,461,516 B2 | 12/2008 | Leadingham et al. | |
| 7,637,012 B2 * | 12/2009 | Thors | F28F 1/42 165/181 |
| 2002/0023737 A1 * | 2/2002 | Hao | F28F 3/02 165/185 |
| 2006/0117773 A1 | 6/2006 | Street et al. | |
| 2007/0125528 A1 | 6/2007 | Fakheri | |
| 2007/0186569 A1 | 8/2007 | Street et al. | |
| 2012/0160465 A1 | 6/2012 | Webb | |

FOREIGN PATENT DOCUMENTS

| | | | |
|---|---|---|---|
| DE | 3815647 | 12/1988 | |
| DE | 202008006379 | 7/2008 | |
| EP | 0640803 | 3/1995 | |
| EP | 1840494 | 10/2007 | |
| GB | 117529 A | 7/1918 | |
| GB | 1390782 | 4/1975 | |
| JP | 2002153931 | 5/2002 | |
| JP | 2004218954 | 8/2004 | |
| WO | WO 89/06774 | 7/1989 | |
| WO | 9416272 A1 | 7/1994 | |
| WO | WO 9416272 A1 * | 7/1994 | B21D 53/06 |
| WO | 2011002711 A1 | 1/2011 | |

* cited by examiner

TUBING ELEMENT WITH FINS FOR A HEAT EXCHANGER

This application claims the benefit of U.S. Provisional Application Nos. 61/731,726, 61/731,715, and 61/731,738, filed Nov. 30, 2012, which is hereby incorporated by reference in its entirety as if fully set forth herein.

BACKGROUND OF THE INVENTION

The present invention relates to a tubing element for a heat exchanger, a heat exchanger, the use of a tubing element to manufacture at least partially a heat exchanger, the use of a heat exchanger to exchange heat and the method of manufacturing of a tubing element.

In the technical field of heat exchangers such as evaporators, condensers, radiators and coolers there have been many attempts to provide compact and energy efficient heat exchangers. A heat exchanger is hereby generally known to provide for an exchange of thermal energy between a first medium such as, for example, water and/or a cooling agent, and a second medium such as, for example, air.

For instance, EP 1 840 494 A2 discloses a heat exchanger, whereby the heat exchanger comprises a profile having two flat tubes with several channels and whereby the tubes are connected by means of a bar. The profile is a one-piece profile and may consist of aluminium or an aluminium alloy.

Moreover, DE 20 2008 006 379 U1 discloses an aluminium or aluminium alloy profile, which can be used for tubes for heat exchangers. The profile has a central channel and several further channels arranged around the central channel.

DE 2 209 325 discloses a tube for heat exchangers having a helical structure. Furthermore, DE 2 209 329 discloses heat exchanger tubes having ribs on the inner side and the outer side of the tube.

Additionally GB 1 390 782 discloses a heat-exchange tubing having spaced metal fins projecting inwardly of the tubing from the wall sections of the tubing and extending longitudinally of the tubing.

Further, EP 0 640 803 A1 relates to heat transfer coil, where a second piece of tubing is wound around the first piece of tubing while the first piece is straight and where the first piece of tubing is then formed to define the overall coil shape and then the first and second pieces of tubing internally sized by internal pressurization to also force the two pieces of tubing to intimate contact with each other.

However, it is still desirable to improve the already known technical solutions in the field of heat exchangers.

Needs exist for improved heat exchangers.

SUMMARY OF THE INVENTION

It is therefore an object for the present invention to improve a tubing element for a heat exchanger, a heat exchanger, the use of a tubing element to manufacture at least partially a heat exchanger, the use of a heat exchanger to exchange heat and a method of manufacturing of a tubing element, in particular in that the efficiency of the heat exchange is increased and that the overall structure of the tubing element and the heat exchanger is improved and simplified and allows a more compact structure of a heat exchanger.

The above object is solved according to the present invention by a tubing element for a heat exchanger. Accordingly, a tubing element for a heat exchanger is provided, the tubing element being at least partially a rigid elongated heat exchanger tubing having at least a first end and at least a second end and having a first side wall and a second side wall, the first side wall and the second side wall being arranged substantially parallel to each other and the distance between the first side wall and the second side wall being considerably smaller than the width of the first side wall and the second side wall, resulting in a substantially overall flat tubing structure with connection walls on both sides, the tubing element having a plurality of fins on at least one of the outer surfaces of the first side wall and/or of the second side wall, wherein the fins have a defining angle γ enclosed by the fins and a connection wall.

The tubing element having a plurality of fins on at least one of the outer surfaces of the first side wall and/or of the second side wall increases the tubing element surface for a better heat exchange between the said second medium, such as air, and the heat exchanger means.

The defining angle γ, enclosed by the fins and a connection wall, extends the way of the heat exchange between the second medium and the surface of the tubing element having a plurality of fins on at least one of the outer surfaces of the first side wall and/or of the second side wall. The plurality of fins generate a better air path along the fins and the tubing element. The fins can influence the direction of the air flow along the tubing element. Due to the orientation of the plurality of fins on at least one of the outer surfaces of the tubing element, the air flow along the tubing element at the heat exchanger can be controlled.

The fins are not perpendicular to a longitudinal direction of the tube in a preferred embodiment.

Such a tubing element for a heat exchanger may be an elongated heat exchanger microchannel tube. Such an elongated heat exchanger microchannel tube may have a first and a second open end. There may be relatively large parallel opposite side walls of the microchannel tube with generally flat surfaces, which are joined with relatively small opposite edge walls between the side walls. These edge walls may be convexly curved.

Heat transfer vapor or fluid may fill a heat exchanger microchannel tube and may flow from one end of the microchannel tube to the other end. The term microchannel is also known as microport.

The said second medium such as air may flow around the outer sides of the tubing element and may transport the heat from the tube away or vice versa.

By providing a plurality of fins on at least one of the outer surfaces of the first side wall and/or of the second side wall the surface for heat exchange is increased. Thus, also the efficiency of the heat exchanger may be significantly improved.

Moreover, it is possible that the width of the first side wall and the second side wall is approximately at least 10 times larger than the distance between the first side wall and the second side wall and/or that the first side wall and second side wall are connected respectively on both sides by a rounded connection wall.

Additionally, it is possible that the tubing element is at least partially tilted or at least partially tilted and sloped and at least partially helically wound and/or twisted so as to form at least a part of a helical structure, whereby preferably the helical structure has an overall cylindrical structure and/or that the helical structure is formed in a cylindrical shape.

A tubing element has a tilted orientation while being helically bent to create a tilted orientation of the fins which are grounded on at least one of the outer surfaces of the first side wall and/or of the second side wall.

The helical structure of the tubing element is determined merely by variables radius r, angle α and angle β. Radius r defines the distance between the center of the tubing element and the central longitudinal axis X of the heat exchanger. Angle α defines the slope of the tubing element and extends between the central longitudinal axis X of the heat exchanger means and the central axis Z of the tubing element. Angle β defines the tilt of the tubing element and extends between the central longitudinal axis X of the heat exchanger and the central transverse axis Y of the tubing element.

Therefore, due to the tilted orientation of the tubing element, there are almost no horizontal surfaces of the tubing element within the heat exchanger. Natural condensate from air moisture disappears very quickly, because of the tilted and at least partially helically wound and/or twisted tubing element. Natural condensate from air moisture disappears to the outside surface of the heat exchanger, because of the tilted orientation of the tubing element. So, freezing of condensate from air moisture between each of said tubing elements can be minimized.

Compared to the prior art, the tubing element, being tilted and at least partially helically wound and/or twisted so as to form at least a part of a helical structure, is more efficient with less material. Also the heat exchanger needs a smaller volume in the whole heat exchanger system, due to the compact set of tubing elements, making this heat exchanger a high power density solution with minimal volumetric footprint.

Further, this tubing element, being tilted and at least partially helically wound and/or twisted so as to form at least a part of a helical structure, is more efficient with less material. Also the heat exchanger needs a smaller volume in the whole heat exchanger system, due to the compact set of tubing elements.

Further, this tubing element, being tilted while being at least partially helically wound and/or twisted so as to form at least a part of a helical structure, effects a better interaction between the said second medium such as air and the surface of the tubing element, due to the tilted orientation of the tubing element.

Furthermore, it is possible that the tubing element has a plurality of fins on both of the outer surfaces of the first side wall and of the second side wall. By providing a plurality of fins on both of the outer surfaces of the first side wall and of the second side wall, the advantage is achieved that the surface used for the heat exchange may be increased very easily and that the volume needed for the tubing element is not increased substantially.

It is also possible that the fins are at least partially covered by a draining plate and/or that the fins are monoblock fins.

The fins may be substantially perpendicularly arranged on at least one of the outer surfaces of the first side wall and/or of the second side wall.

Alternatively, the fins are inclined arranged on the at least one of the outer surfaces of the first side wall and/or of the second side wall, whereby exemplarily the angle between the fins and the outer surface is chosen within a range of approximately 15° to 85°.

Additionally, the fins merely extend along the whole width of at least one of the outer surfaces of the first side wall and/or of the second side wall and/or are curved.

Furthermore, the fins may be arranged along a curve extending along the whole width of at least one of the outer surfaces of the first side wall and/or of the second side wall and/or are curved, whereby between the fins being arranged along a curve is a pitch and/or gap.

It is possible that the fins and/or the curve of fins and at least one of the connection walls are arranged such to each other that they enclose an angle. The angle may be substantially perpendicular. Alternatively, the angle may be chosen within range of about 15° to about 60° and is preferably chosen within a range of about 20° to about 25°. An angle of about 45° between the fins or the curve of fins and at least one of the connection walls is considered to be substantially neutral, in particular as a neutral arrangement with respect to the interference with e.g. fans or the like, which might be connected or used together with a heat exchanger comprising such a tubing element.

The fins and/or the curve of fins may be formed slightly concave or convex. In particular, the slightly concave or convex shape of the fins may be achieved by an offset of the center part of the middle section of the fins and/or the curve of fins with respect to the endpoints of the fins and/or the curve of fins within a range of about 0.5 mm to about 5 mm, preferably of about 1 mm to about 2 mm, most preferred of about 1.5 mm.

It is preferred that the fins are arranged such that the medium flowing against the fins flows against a concave formed part of the fin.

The fins may have a height chosen within a range of about 0.5 mm to about 5.0 mm, preferably about 2-3 mm.

Further, it is possible that the fins are arranged in a plurality of rows, preferably substantially parallel rows and/or preferably along at least a part of the length of the tubing element.

The tubing element may comprise at least one microchannel. Preferably several microchannels with a round or circular cross-section and/or several microchannels with an angular cross-section, exemplarily several microchannels with a triangular cross-section and/or several microchannels with quadrangular cross-section are provided.

At least some of the microchannels may be arranged with an off-set to each other, whereby exemplarily all microchannels are arranged with an off-set to each other.

The off-set may result in several chamfers and/or grooves within the first side wall and/or the second side wall.

Furthermore, the tubing element may comprise at its a first end and at its second end a collecting portion which is reducing the width of the first side wall and the second side wall to a smaller width.

Moreover, the present invention relates to a heat exchanger. Accordingly, a heat exchanger is provided, the heat exchanger having at least one tubing element.

Additionally, the heat exchanger may comprise several tubing elements and that the tubing elements are forming as a substantially overall cylindrical structure having a central longitudinal axis and that the tubing elements are spirally curved around the central longitudinal axis and interleaved in the structure.

The heat exchanger may be a radiator or a cooler or a condenser or an evaporator.

Additionally, the present invention relates to the use of a tubing element to manufacture at least partially a heat exchanger. Accordingly, a tubing element is used to manufacture at least partially a heat exchanger exemplarily by tilting or by tilting and sloping and at least partially helically winding and/or twisting the tubing element so to form at least a part of a helical structure.

Moreover, the present invention relates to the use of a heat exchanger to exchange heat. Accordingly, a heat exchanger is used, whereby the heat exchanger is a heat exchanger to exchange heat, exemplarily to use a heat exchanger as a radiator or as a cooler or as a condenser or as an evaporator.

Furthermore, the present invention relates to a method of manufacturing of a tubing element. Accordingly, a tubing element is manufactured, whereby exemplarily the tubing element is received by using an extrusion process of a heat transfer material, whereby preferably the extrusion process is a single extrusion process and/or whereby preferably the heat exchanger material is at least partially aluminium or copper or an alloy thereof.

Further details and advantages of the present invention shall be described hereinafter with respect to the drawings.

These and further and other objects and features of the invention are apparent in the disclosure, which includes the above and ongoing written specification, with the claims and the drawings.

DETAILED DESCRIPTION

Figure 1:
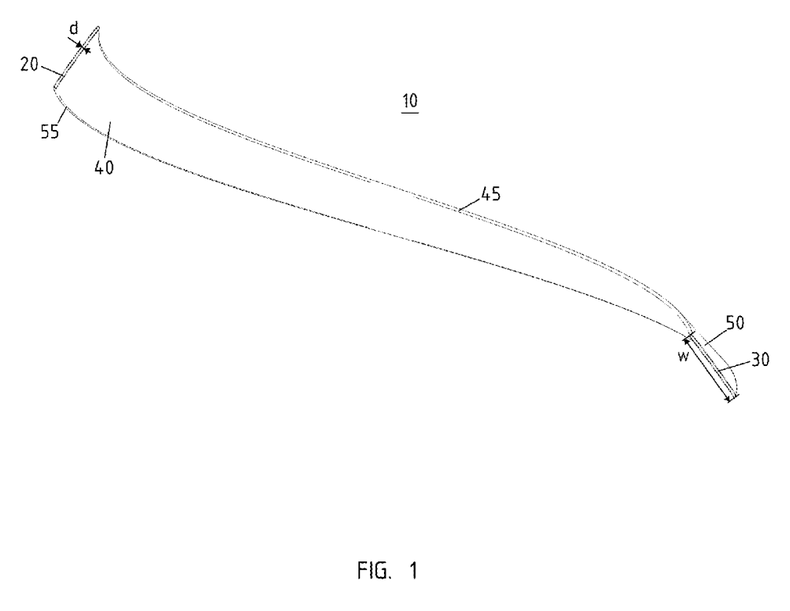
FIG. 1 is a perspective view of tubing element according to the present invention in a first embodiment.

FIG. 1 shows the perspective view of a first embodiment of the tubing element 10, however, without fins 60 or fins 60'.

The tubing element 10 is a rigid elongated heat exchanger tube having a first end 20 and a second end 30. There are relatively large parallel opposite side walls 40 and 50 with generally flat surfaces. The opposite parallel arranged side walls 40, 50 of the tubing element are joined with relatively small opposite edge walls 45, 55, which are rounded connection walls 45, 55. The tubing element 10 is partially tilted and sloped and also helically wound and twisted so as to form at least a part of a helical structure.

The distance d between the first side wall 40 and the second side wall 50 is considerably smaller than the width W of the side walls 40, 50.

There are relatively large parallel opposite side walls 40 and 50 with generally flat surfaces. The opposite parallel arranged side walls 40, 50 of the tubing element are joined with relatively small opposite edge walls 45, 55, which are rounded connection walls 45, 55. The tubing element 10 is partially tilted and sloped and also helically wound and twisted so as to form at least a part of a helical structure.

The opposite side walls 40 and 50 of the heat exchanger microchannel tube 10 are oppositely disposed in general parallel planes in the helix within the tube 10 there may be one or more media flow channels, which are formed between the oppositely disposed side walls 40, 50. A heat transfer vapor or fluid such as water or oil or refrigerant fills the heat exchanger microchannel tube 10 and flows from one end 20 of the microchannel tube 10 to the other end 30. Preferably, the resulting helix of the microchannel tube 10 is formed in a cylindrical shape.

Figure 2:
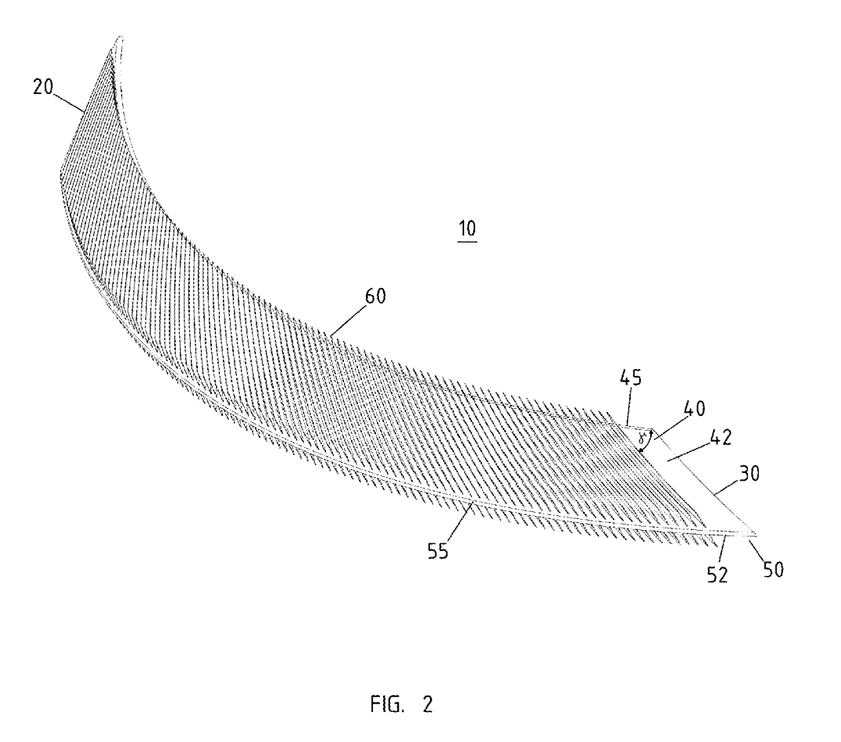
FIG. 2 is a perspective view of a tubing element according to a first embodiment of the present invention.

FIG. 2 shows a perspective view of a first embodiment of the tubing element 10. On both outer surfaces 42, 52 of the first side wall 40 and the second side wall 50 several fins 60 are arranged.

The fins 60 may be monoblock fins and are inclined arranged respective to the outer surface 42, 52 of the first side wall 40 and a second side wall 50. The angle between the fins and the outer surface 42, 52 is 22.5 degrees in this example. The fins 60 merely extend along the whole width W of the outer surfaces 42, 52 of the first side wall 40 and the second side wall 50.

Figure 5:
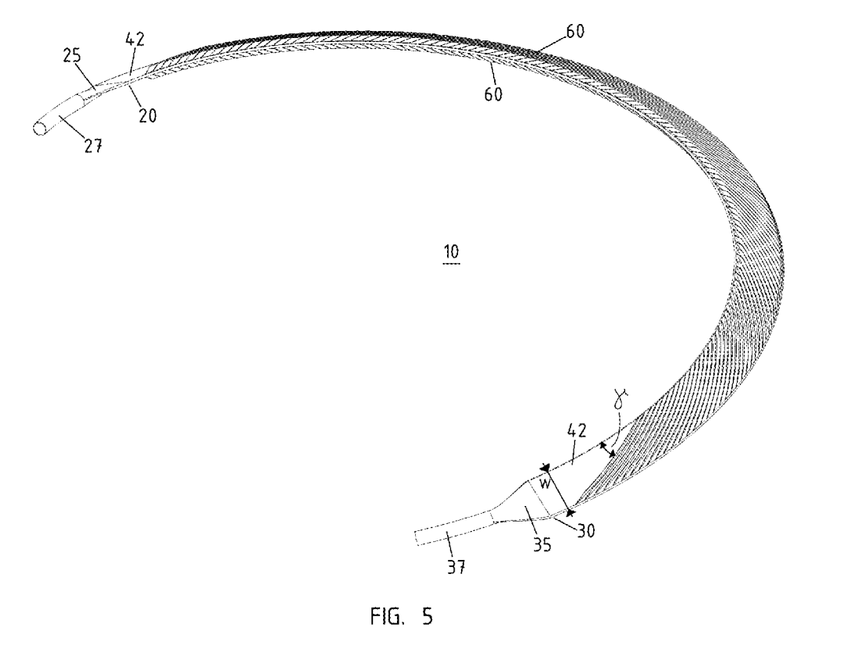
FIG. 5 is a perspective view of a tubing element according to the present invention and as shown in FIG. 2 together with connecting elements.
Figure 6:
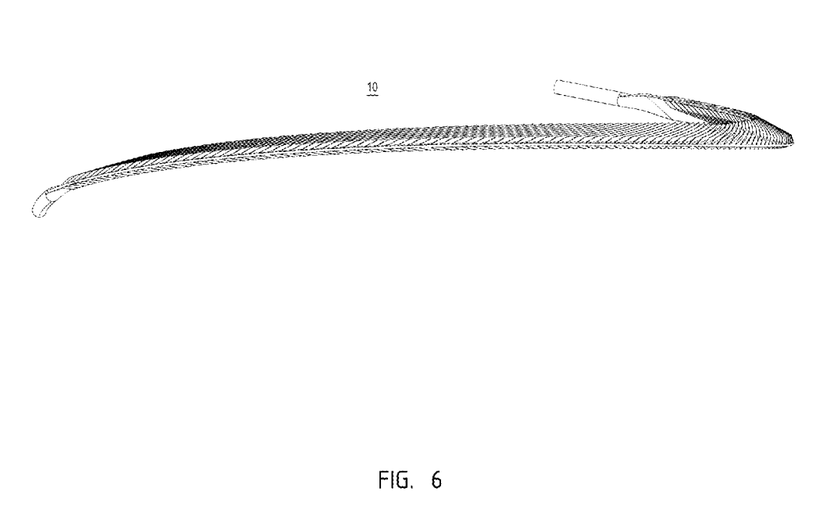
FIG. 6 is a side elevation of the tubing element as shown in FIGS. 2 to 5.

As can be seen e.g. in FIGS. 5 and 6, the fins 60 are slightly curved.

Figure 3:
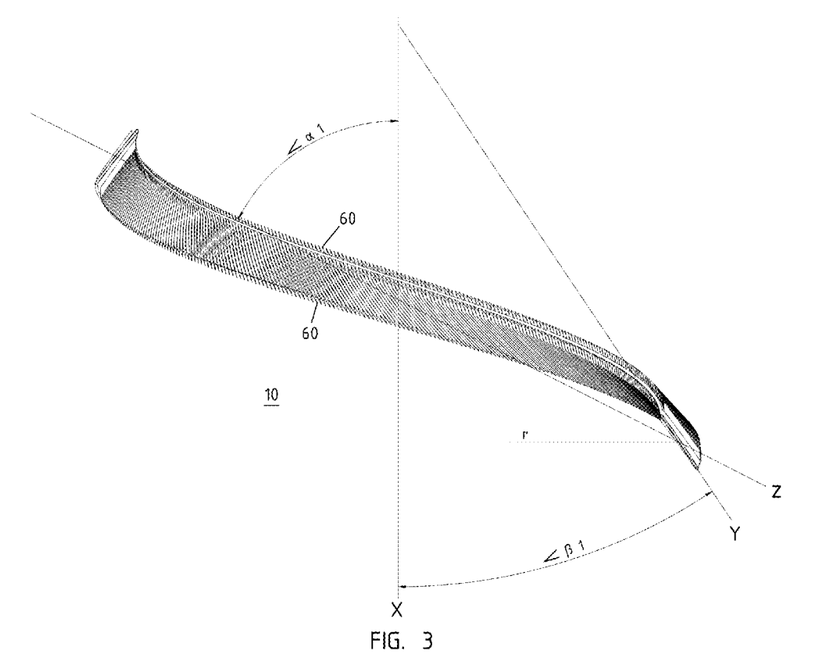
FIG. 3 is a further perspective view of the tubing element shown in FIG. 2 showing the angles for the slope and the tilt of the tubing element.

FIG. 3 shows the defining angles, i.e. angle $\alpha 1$ defining a slope and angle $\beta 1$ defining the tilt. Furthermore, FIG. 3 shows the defining axes X, Y and Z and also the radius r. The heat exchanger microchannel tube 10 may be longitudinally curved around the central axis X into a helix. This axis X is shown in FIG. 3 and is the central axis X of the overall and imaginary cylindrical shape of the helix.

As can be seen in FIG. 3, the fins 60 follow the slope and the tilt.

Angle $\alpha 1$ defining the slope is defined as the angle $\alpha 1$ between axis X and Z. Angle $\beta 1$ defining the tilt is defined as to angle $\beta 1$ between axis X and Y. As can be seen in FIG. 3, the radius r is the distance from axis X to the center of the angled finned tubing element 10 and/or to the intersection point of axis Y and axis Z.

Figure 4:
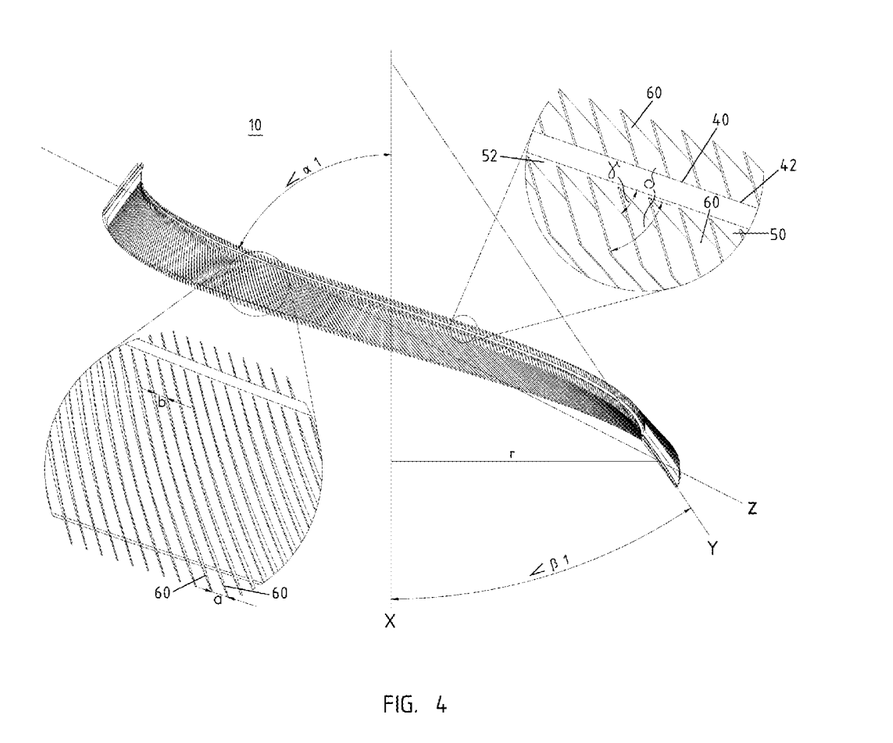
FIG. 4 shows the perspective view shown in FIG. 3 with further details.
Figure 8:
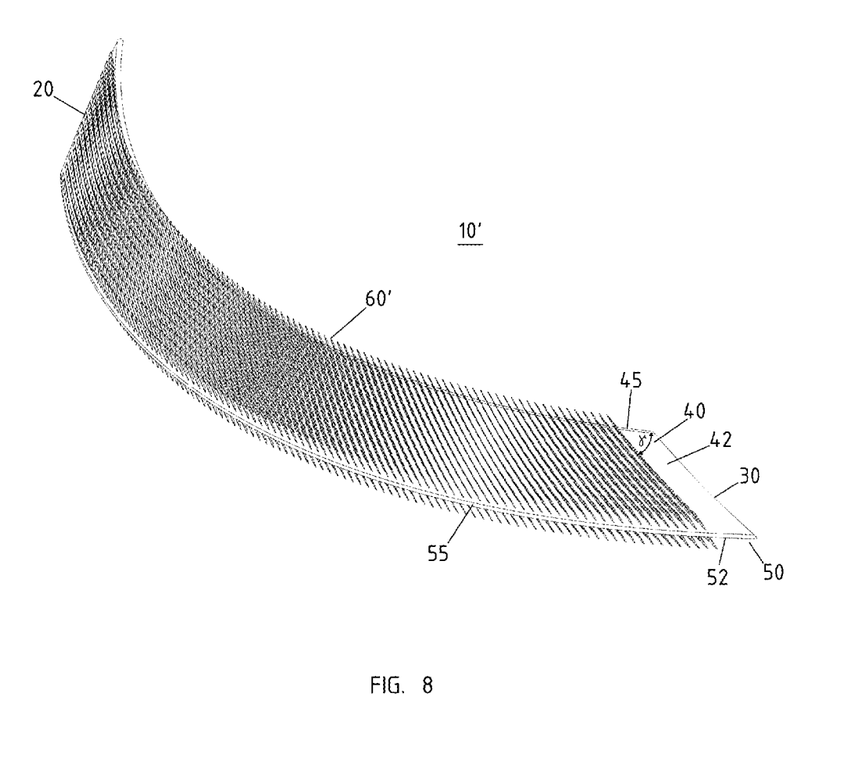
FIG. 8 is a perspective view of a tubing element according to the present invention in a second embodiment.

As can be further seen from FIG. 4, the fins 60 have two defining angles $\Upsilon$ and $\delta$. The angle $\Upsilon$ is the angle which is enclosed by the fins 60 and the connection walls 45, 55 as also shown in FIGS. 2, 5 and 8. The angle $\delta$ is the angle of the fin 60 and the outer surface 42, 52 of the first side wall 40 or the second side wall 50.

As can be seen from the further detail shown in FIG. 4, the first distance a between two adjacent fins 60 may be larger than a second distance b of these adjacent fins 60. The first distance a may be used in the entry section of the gap defined by two adjacent fins 60, i.e. the section for the entry of a heat transfer media flowing through the fins. So, the fins 60 are substantially parallel.

The fins 60 according to the embodiment shown in FIGS. 2 to 6 are arranged on angles between 22.5 and 45 degrees to the outer surfaces 42, 52 of the first side wall 40 and of the second side wall 50.

This is, however, not mandatory. Alternatively, the fins 60 may be inclined arranged on the at least one of the outer surfaces 42, 52 of the first side wall 40 and/or of the second side wall 50, whereby exemplarily the angle between the fins 60 and the outer surface 42 or 52 may be chosen within a range of approximately 15° to 85°.

The fins 60 merely extend along the whole width W of the outer surfaces 42, 52 of the first side wall 40 and/or of the second side wall 50 and are slightly curved.

Further, the fins 60 are arranged in a plurality of parallel rows substantially along the whole length of the tubing element 10.

The fins 60 and the connection walls 45, 55 are arranged such to each other that they enclose an angle γ.

However, this angle γ may be substantially perpendicular. Alternatively, this angle γ may be chosen within range of about 15° to about 60° and may be preferably chosen within a range of about 20° to about 25°. An angle γ of about 45° between the fins 60 at least one of the connection walls 45, 55 is considered to be substantially neutral, in particular as a neutral arrangement with respect to the interference with e.g. fans or the like, which are connected or used together with a heat exchanger comprising such a tubing element 10.

The fins 60 are formed slightly concave or convex, which is, however, not mandatory. In particular, the slightly concave or convex shape of the fins 60 may be achieved by an offset of the center part of the middle section of the fins 60 with respect to the endpoints of the fins 60 within a range of about 0.5 mm to about 5 mm, preferably of about 1 mm to about 2 mm, most preferred of about 1.5 mm. In the embodiment shown in FIG. 2, the offset of the center part of the middle section of the fins 60 with respect to the endpoints of the fins 60 is about 1 mm.

The fins 60 are arranged such that the medium flowing against the fins flows against a concave formed part of the fin.

Furthermore, the fins 60 according to the embodiment shown in FIG. 2 have a height of about 2.5 mm. Generally, the fins 60 may have a height chosen within a range of about 0.5 mm to about 5.0 mm, preferably about 2-3 mm.

At the ends 20, 30 of the tubing element 10 collecting elements 25, 35 are provided, which reduce width of the tubing element 10 to a broader diameter, i.e. the diameter of the tubular connectors of circular cross-sections 27, 37.

Figure 7:
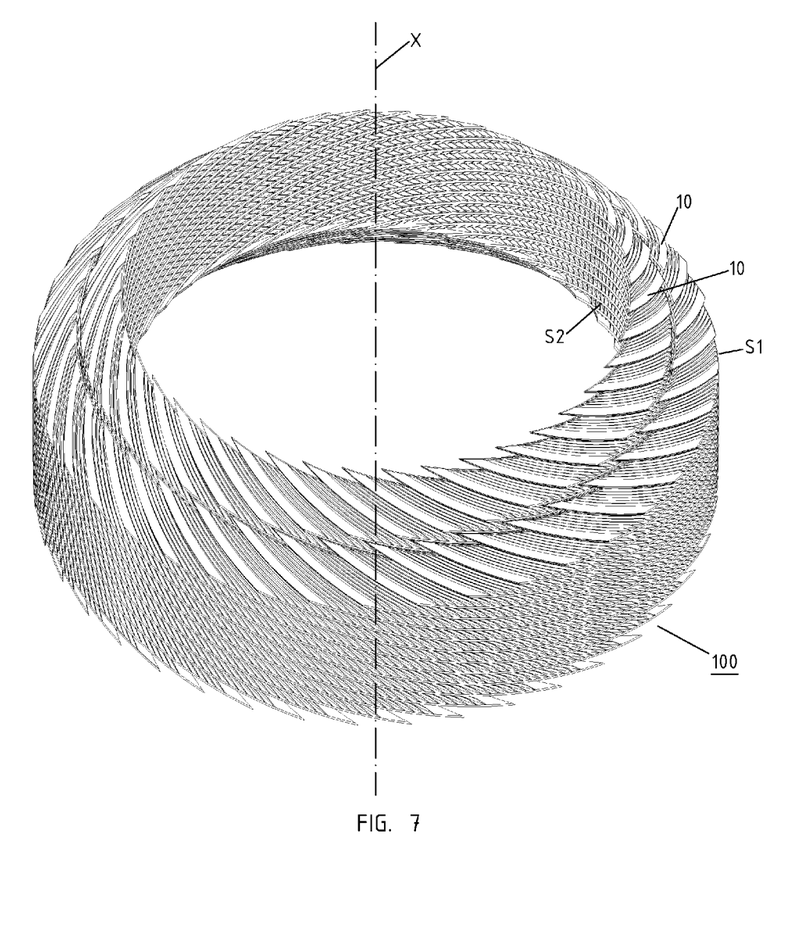
FIG. 7 is a perspective view of a heat exchanger comprising a plurality of tubing elements.

FIG. 7 is a perspective view of a heat exchanger 100 comprising a plurality of a first set of interlaced tilted helical microchannel tubing elements 10 with adjacent tilted and twisted similarly helically formed tubing elements 10 and a respective second set S2 inside of the first set S1. By this, a compact structure together with an increased surface for heat exchange is received.

FIG. 8 is a perspective view of the second embodiment of the tubing element according to the present invention. The second embodiment of the tubing element 10' is merely the same as the one shown in FIGS. 2 to 6. However, a different kind of fins is used, i.e. fins 60'. The fins 60' are arranged along a curve extending substantially the whole width W of at least one of the outer surfaces 42, 52 of the sidewall 40 and sidewall 50 and as can be seen from FIG. 9, between each fins 60' arranged along one curve a gap is provided. The fins 60' are arranged in a plurality of rows which are arranged parallel.

The fins 60' are according to the embodiment shown in FIG. 8 arranged on an angle of 22.5 degrees to the outer surfaces 42, 52 of the first side wall 40 and of the second side wall 50.

Alternatively, the fins 60' may be inclined arranged on at least one of the outer surfaces 42, 52 of the first side wall 40 and/or of the second side wall 50, whereby exemplarily the angle between the fins 60' and the outer surface 40, 50 is substantially perpendicular.

Furthermore, the fins 60' are arranged along a curve extending along the whole width W of the outer surfaces 42, 52 of the first side wall 40 and/or of the second side wall 50 and are also curved, whereby between the fins 60' being arranged along a curve is a gap 62.

It is possible that the fins 60' and the curve of fins 60' and the connection walls 45, 55 are arranged such to each other that they enclose an angle γ.

However, this angle γ may be substantially perpendicular. Alternatively, this angle γ may be chosen within range of about 15° to about 60° and may be preferably chosen within a range of about 20° to about 25°. An angle γ of about 45° between the fins 60 at least one of the connection walls 45, 55 is considered to be substantially neutral, in particular as a neutral arrangement with respect to the interference with e.g. fans or the like, which may be connected or used together with a heat exchanger comprising such a tubing element 10.

The fins 60' and the curve of fins 60' is formed slightly concave. In particular, the slightly concave shape of the fins 60' is achieved by an offset of the center part of the middle section of the fins 60' and the curve of fins 60' with respect to the endpoints of the fins 60' and the curve of fins 60' within a range of about 0.5 mm to about 5 mm, preferably of about 1 mm to about 2 mm, most preferred of about 1.5 mm.

The fins 60' are arranged such that the medium flowing against the fins 60' flows against a concave formed part of the fins 60'.

Furthermore, the fins 60' according to the embodiment shown in FIG. 8 have a height of about 3 mm. Generally, the fins 60' may have a height chosen within a range of about 0.5 mm to about 5.0 mm, preferably about 2-3 mm.

The curves of fins 60' are arranged in a plurality of substantially parallel rows along the tubing element.

Figure 9:
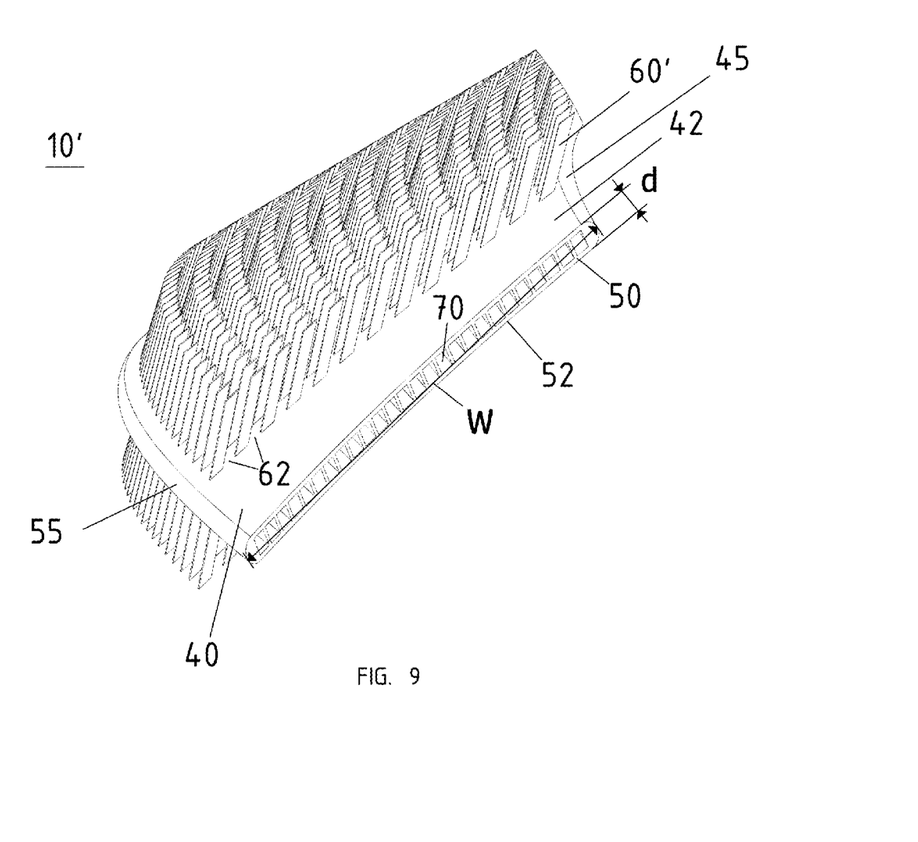
FIG. 9 is a perspective view in detail of embodiment shown in FIG. 8.

FIG. 9 is showing in detail embodiment of a tube 10' with fins 60' as shown in FIG. 8 and having a plurality of microchannels 70 with a square cross-section.

Figure 10A:
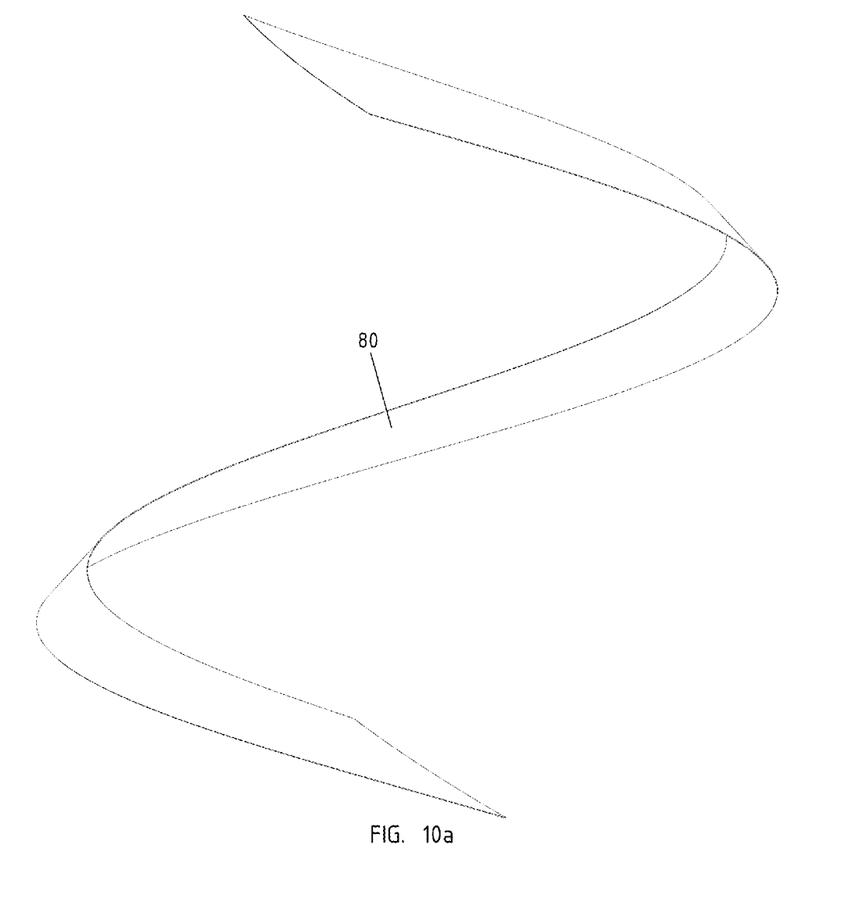
FIGS. 10a and 10b are the perspective view of a draining plate and the respective tubing element thereto.
Figure 10B:
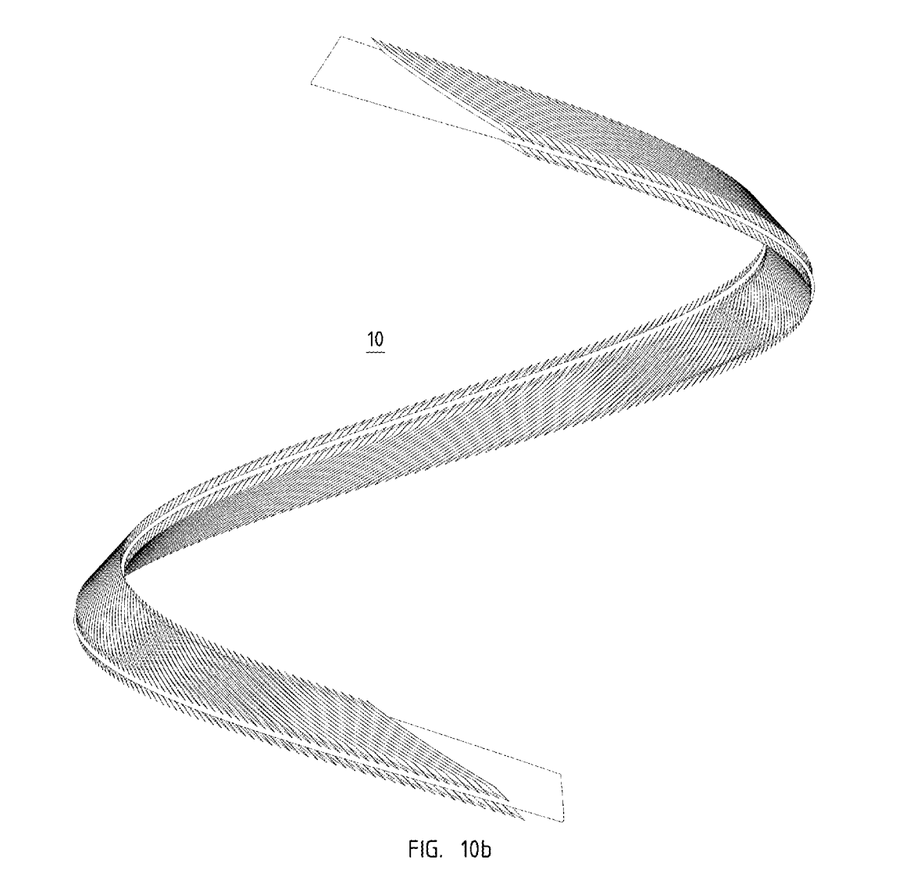

FIG. 10a shows in a perspective view a draining plate 80 which is tilted and helically wound such that it can be attached to the helically wound heat exchanger microchannel tube 10 as shown in FIG. 10b.

Figure 11:
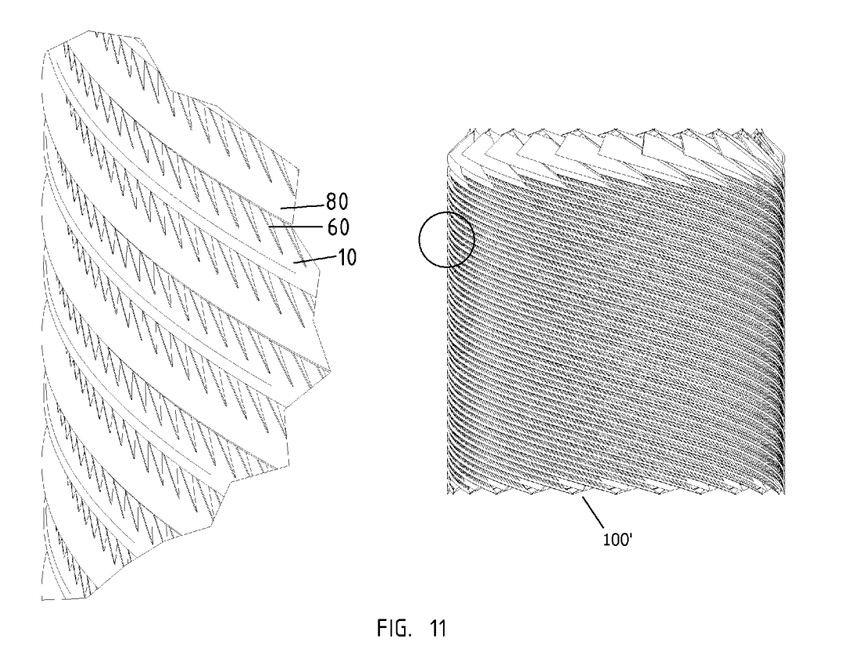
FIG. 11 is a perspective view of a further embodiment of a heat exchanger comprising the draining plate and the tubing element according to FIGS. 10a and 10b.

As can be further seen from FIG. 11, several draining plates 80 and heat exchanger tubes 10 may be arranged to a heat exchanger 100 comprising a plurality of interlaced sloped and tilted helically wound microchannel tubing elements 10 and draining plates 80 between each of the pair of adjacent tubing elements 10.

The use of draining plates 80 is preferred in cases where the heat exchanger 100 is an evaporator.

While the invention has been described with reference to specific embodiments, modifications and variations of the invention may be constructed without departing from the scope of the invention, which is defined in the following claims.

I claim:

1. Finned tubing element (10, 10') for a heat exchanger (100, 100'), the finned tubing element (10, 10') being at least partially a rigid elongated heat exchanger tubing having at least a first end (20) and at least a second end (30) and having a first side wall (40) and a second side wall (50), the first side wall (40) and the second side wall (50) being arranged substantially parallel to each other and the distance (d) between the first side wall (40) and the second side wall (50) being considerably smaller than the width (W) of the first side wall (40) and the second side wall (50) resulting in a substantially overall flat tubing structure with connection walls (45, 55) on both sides, the finned tubing element (10, 10') having a plurality of fins (60, 60') on at least one of the outer surfaces (42, 52) of the first side wall (40) and/or of the second side wall (50), wherein the fins (60, 60') are angled with respect to the finned tubing element by two defining angles (γ, δ), wherein the first angle (γ) is an angle of the fins (60, 60') with respect to the connection walls (45, 55) of the finned tubing element, wherein the second angle (δ) is the angle of the fins (60, 60') with respect to the outer surfaces (42, 52) of the first side wall (40) or the second side wall (50),
wherein the finned tubing element (10, 10') is at least partially tilted, sloped, and at least partially helically wound and twisted so as to form at least a part of a helical structure, wherein the fins are twisted between endpoints of the fins along a flow direction and curved by an offset of a center part of a middle section of each fin with respect to the endpoints of each fin.

2. Finned tubing element (10, 10') according to claim 1, wherein the helical structure has an overall cylindrical structure and/or that the helical structure is formed in a cylindrical shape.

3. Finned tubing element (10, 10') according to claim 1, wherein the finned tubing element (10, 10') has a plurality of fins (60, 60') on both of the outer surfaces (42, 52) of the first side wall (40) and of the second side wall (50).

4. Heat exchanger (100, 100') according to claim 3, further comprising a draining plate (80) between each pair of adjacent finned tubing elements.

5. Finned tubing element (10, 10') according to claim 1, wherein the fins (60, 60') are monoblock angled fins (60, 60').

6. Finned tubing element (10, 10') according to claim 1, wherein the angled fins (60, 60') are substantially perpendicularly arranged on at least one of the outer surfaces (42, 52) of the first side wall (40) and/or of the second side wall (50).

7. Finned tubing element (10, 10') according to claim 1, wherein the fins (60, 60') are inclined arranged on the at least one of the outer surfaces (42, 52) of the first side wall (40) and/or of the second side wall (50), whereby the second angle (δ) between the fins (60, 60') and the outer surface (42, 52) is chosen within a range of approximately 15° to 85°, and that the fins (60, 60') and at least one of the connection walls (45, 55) are arranged such that they enclose the first angle (γ).

8. Finned tubing element (10, 10') according to claim 1, wherein the fins (60) merely extend along the whole width (W) of at least one of the outer surfaces (42, 52) of the first side wall (40) and/or of the second side wall (50).

9. Finned tubing element (10, 10') according to claim 1, wherein the fins (60, 60') are arranged along a curve extending along the whole width (W) of at least one of the outer surfaces (42, 52) of the first side wall (40) and/or of the second side wall (50), whereby between the fins (60, 60') is a pitch and the angled fins (60, 60') are arranged in a plurality of substantially parallel rows along at least a part of the length of the finned tubing element (10').

10. The use of a finned tubing element (10, 10') according to claim 1 to manufacture at least partially a heat exchanger (100, 100') by tilting, sloping and at least partially helically winding and twisting the finned tubing element (10, 10') so as to form at least a part of a helical structure.

11. Method of manufacturing of a finned tubing element (10, 10') according to claim 1, whereby the finned tubing element (10, 10') is received by using an extrusion process of a heat transfer material, whereby the extrusion process is a single extrusion process and/or whereby preferably the heat transfer material is at least partially aluminium or copper or an alloy thereof.

12. Finned tubing element (10, 10') according to claim 1, wherein the tilted, sloped and twisted finned tubing element has curved connection walls (45, 55) and surfaces (42, 52), whereby all surfaces of the finned tubing element and of the fins are curved.

13. Finned tubing element (10, 10') according to claim 1, wherein a first distance (a) between two adjacent fins is larger than a second distance (b) between the adjacent fins and wherein the first distance (a) is at an entry section of gaps between the fins.

14. Finned tubing element (10, 10') according to claim 1, further comprising collecting elements (25, 35) and tubular connectors (27, 37) at the first and second ends (20, 30) of the finned tubing elements (10, 10').

15. Finned tubing element (10, 10') according to claim 1, wherein the width (W) of the first side wall (40) and the second side wall (50) is approximately at least 10 times larger than the distance (d) between the first side wall (40) and the second side wall (50) and/or that the first side wall (40) and second side wall (50) are connected respectively on both sides by a rounded connection wall (45, 55).

16. Finned tubing element (10') according to claim 1, wherein the fins (60') are segmented with gaps (62).

17. Heat exchanger (100, 100') having at least one finned tubing element (10, 10'), the finned tubing element (10, 10') being at least partially a rigid elongated heat exchanger tubing having at least a first end (20) and at least a second end (30) and having a first side wall (40) and a second side wall (50), the first side wall (40) and the second side wall (50) being arranged substantially parallel to each other and the distance (d) between the first side wall (40) and the second side wall (50) being considerably smaller than the width (W) of the first side wall (40) and the second side wall (50) resulting in a substantially overall flat tubing structure with connection walls (45, 55) on both sides,
the finned tubing element (10, 10') having a plurality of angled fins (60, 60') on at least one of the outer surfaces (42, 52) of the first side wall (40) and/or of the second side wall (50), wherein the fins (60, 60') are angled with respect to the finned tubing element by two defining angles (γ, δ), wherein the first angle (γ) is an angle of the fins (60, 60') with respect to the connection walls (45, 55) of the finned tubing element, wherein the second angle (δ) is the angle of the fins (60,60') with respect to the outer surfaces (42, 52) of the first side wall (40) or the second side wall (50),
wherein the finned tubing element (10, 10') is at least partially tilted, sloped, and at least partially helically wound and twisted so as to form at least a part of a helical structure, wherein the fins are twisted between endpoints of the fins and curved by an offset of a center part of a middle section of each fin with respect to the endpoints of each fin.

18. Heat exchanger (100, 100') according to claim 17, further comprising several finned tubing elements (10, 10') forming an overall substantially cylindrical structure having a central longitudinal axis (X), and wherein the finned tubing elements (10, 10') are spirally curved around the central longitudinal axis (X) and interleaved in the structure.

19. Heat exchanger (100, 100') according to claim 17, wherein the heat exchanger (100, 100') is a condenser or an evaporator or a radiator or a cooler.

20. The use of a heat exchanger (100, 100') according to claim 17 to exchange heat and to use the heat exchanger (100, 100') as a radiator or as a cooler as a condenser or as an evaporator.

* * * * *